United States Patent
Chen et al.

(10) Patent No.: US 8,510,748 B2
(45) Date of Patent: Aug. 13, 2013

(54) PORTABLE COMMUNICATION DEVICE OPERATING METHOD

(75) Inventors: Wei-Chieh Chen, Taipei (TW); Wen-Kai Wang, Taipei (TW)

(73) Assignee: Inventec Corporation, Taipei (TW)

( * ) Notice: Subject to any disclaimer, the term of this patent is extended or adjusted under 35 U.S.C. 154(b) by 269 days.

(21) Appl. No.: 13/031,618

(22) Filed: Feb. 22, 2011

(65) Prior Publication Data
US 2012/0137296 A1    May 31, 2012

(30) Foreign Application Priority Data
Nov. 30, 2010    (CN) .......................... 2010 1 0575436

(51) Int. Cl.
*G06F 9/46*    (2006.01)
*G06F 9/44*    (2006.01)
*G06F 9/445*    (2006.01)

(52) U.S. Cl.
USPC ............ 718/106; 717/173; 717/177; 717/178

(58) Field of Classification Search
None
See application file for complete search history.

(56) References Cited

U.S. PATENT DOCUMENTS

| 5,404,520 A | * | 4/1995 | Sonobe | 718/101 |
| 8,204,907 B1 | * | 6/2012 | Smith | 707/783 |
| 2002/0015057 A1 | * | 2/2002 | Park | 345/738 |

FOREIGN PATENT DOCUMENTS

| TW | I242746 | 11/2005 |
| TW | 200949750 | 12/2009 |

* cited by examiner

*Primary Examiner* — Camquy Truong
(74) *Attorney, Agent, or Firm* — CKC & Partners Co., Ltd.

(57) ABSTRACT

A portable communication device operating method includes the following steps: receiving a first software opening command to open a first software. Then, a portable communication device opens the first software. The portable communication device stores several pre-load relations, wherein each of the pre-load relations records at least one pre-load software to be pre-loaded after a preset software is opened. At least one second software to be pre-loaded after the first software is opened is obtained by inquiring the pre-load relations according to the first software. The portable communication device pre-loads the second software. A second software opening command to open the second software is received. The portable communication device opens the pre-loaded second software.

8 Claims, 1 Drawing Sheet

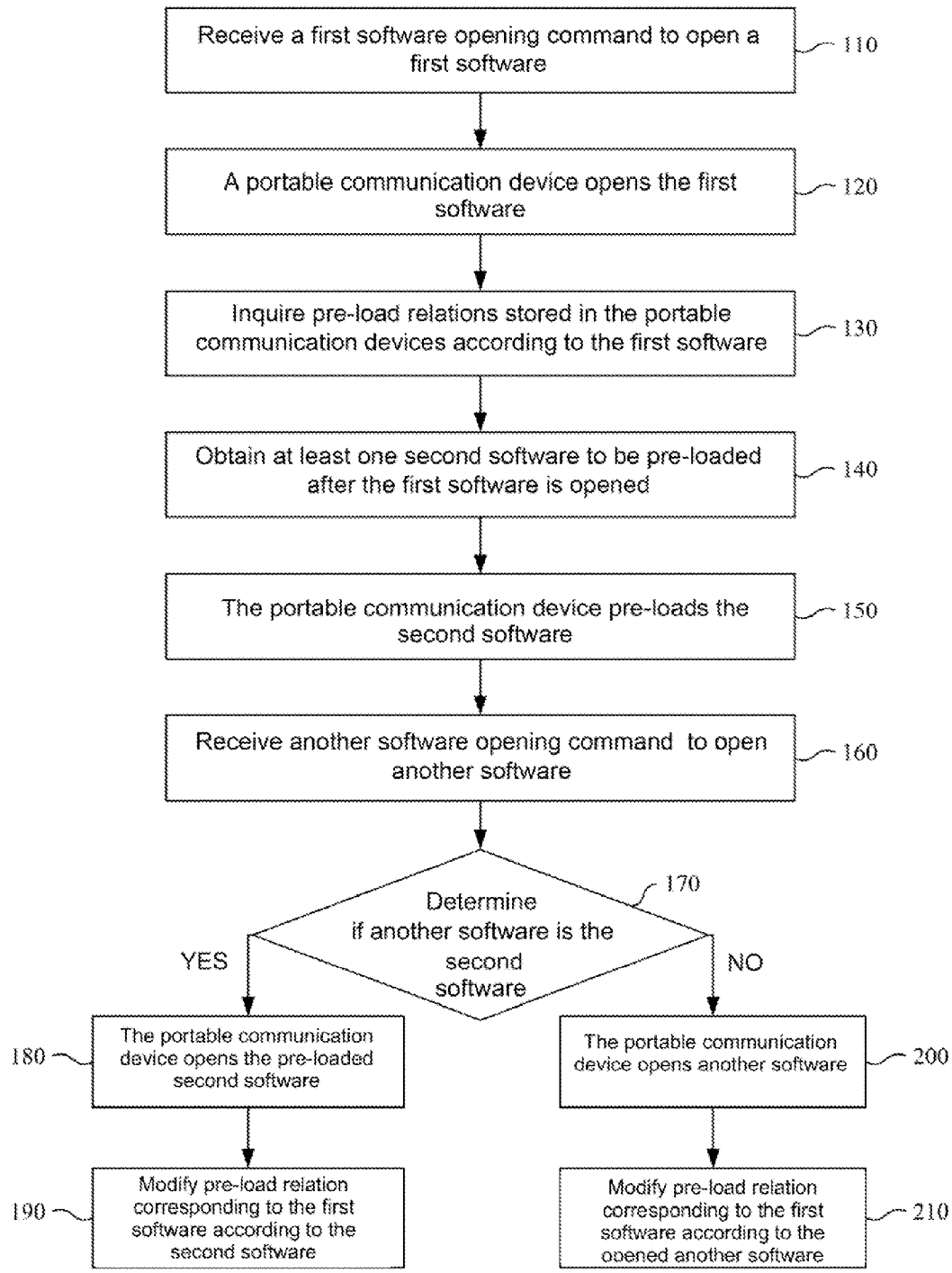

PORTABLE COMMUNICATION DEVICE OPERATING METHOD

RELATED APPLICATIONS

This application claims priority to China Application Serial Number 201010575436.5, filed Nov. 30, 2010, which is herein incorporated by reference.

BACKGROUND

1. Field of Invention

The present invention relates to a communication device operating method, and more particularly, the present invention relates to a portable communication device operating method.

2. Description of Related Art

Along with the development of 3C (Computer, Communications and Consumer) industries, more and more people will use a portable device as an assisting tool in their daily life. For example, common portable devices include a personal digital assistant (PDA), a mobile phone, a smart phone and so on, and these portable devices have the characteristics of light volume and easy to carry, so that the population using the portable devices grows and more functions are needed.

Hence, the portable device has more and more functions to be performed. For performing a variety of functions, the portable communication device is required to load different softwares in correspondence to operations of the user. However, common portable devices are small and light and are mostly battery-powered, and thus have relatively low efficacy and take longer time for loading software.

Generally speaking, since a screen of a portable communication device is relatively small, normally, only one software under execution is displayed and other opened softwares would reside in a memory so as to be immediately displayed on the screen once being selected by the user.

However, since the memory capacity of the portable communication device is generally small, not all frequently used or opened softwares can be pre-loaded in the memory. Thus, if the user opens a software which is not resided in the memory, the portable communication device has to firstly load the software into the memory for displaying the software on the screen. The aforementioned situation requires the user to wait for the switching between softwares, and thus the user cannot operate the portable communication device conveniently.

SUMMARY

Accordingly, an aspect of the present invention is to provide a portable communication device operating method for, for pre-loading a relevant next software to be opened according to a software which is opened by a portable communication device. The portable communication device operating method includes the following steps: receiving a first software opening command to open a first software. Then, a portable communication device opens the first software. The portable communication device stores several pre-load relations, and each of the pre-load relations records at least one pre-load software to be pre-loaded after a preset software is opened. At least one second software to be pre-loaded after the first software is opened is obtained by inquiring the pre-load relations according to the first software. The portable communication device pre-loads the second software. A second software opening command to open the second software is received. The portable communication device opens the second software which has been pre-loaded.

It can be seen from the above embodiments of the present invention that the application of the present invention has the following advantages. The first software which has been opened is used as the basis for pre-loading a software, so that the pre-loaded software has a higher probability to be opened. Especially, when an embodiment of the present invention is applied in a portable communication device (for example, a smart phone, a PDA or another type of a portable communication device) with a limited hardware resource and a low loading speed, if a software to be opened later is pre-loaded correctly, the execution efficiency of the portable communication device will be improved, thus saving the time for loading the software. Furthermore, pre-load relations of all softwares may be modified according to the opening sequence of the softwares to be operated by the portable communication device, so that the softwares pre-loaded by the portable communication device may conform better to the habits of the user.

BRIEF DESCRIPTION OF THE DRAWINGS

The invention can be more fully understood by reading the following detailed description of the embodiments, with reference made to the accompanying drawings as follows:

FIG. 1 is a flow chart showing a portable communication device operating method according to an embodiment of the present invention.

DETAILED DESCRIPTION

The spirit of the present invention will be illustrated in details with reference to drawings and detailed description, and those of ordinary skill in the art would understand that modifications and alternations may be made on the embodiments of the present invention under the teaching of the present invention without departing the spirit and scope of the present invention.

FIG. 1 is a flow chart showing a portable communication device operating method according to an embodiment of the present invention. In the portable communication device operating method, according to a software which is opened by the portable communication device, a relevant next software is pre-loaded for allowing the portable communication device to open it. The portable communication device operating method 100 includes the following steps.

In step 110, a first software opening command is received to open a first software. The first software opening command may be generated via a user interface. The user interface may be a keyboard, a pushbutton, a touch panel, a mouse or another type of the user interface. In other words, the user may generate a first software opening command to open the first software via the user interface.

In step 120, a portable communication device opens the first software. The portable communication device stores several pre-load relations, and each of the pre-load relations records at least one pre-load software to be pre-loaded after a preset software is opened. Furthermore, the portable communication device may be a smart phone, a PDA or another type of a portable communication device.

Thereafter, at least one second software to be pre-loaded after the first software is opened is obtained (step 140) by inquiring pre-load relations stored in the portable communication devices according to the first software (step 130).

In step 150, the portable communication device pre-loads the second software obtained in step 140.

Thereafter, after another software opening command to open another software is received (step 160), it is determined if another software is the pre-loaded second software (step 170). Another software opening command may be generated via a user interface. In other words, the user may generate another software opening command to open another software via the user interface.

In step 180, when another software to be opened is the pre-loaded second software, the portable communication device opens the pre-loaded second software. In this way, the portable communication device can execute the second software without reloading the second software. In other words, the time for loading second software started after the portable communication device receives the command to open the second software may be saved. Furthermore, since the softwares often follows a certain opening sequence to be opened, according to the fact that the opened first software is used as the basis for pre-loading the second software, the pre-loaded second software will have a higher probability to be executed, thus having a higher probability of saving the loading time.

For example, after the user uses the portable communication device to open a camera software (first software), the user normally open an image browsing software (second software) to browse the image captured by the camera. Therefore, after a command to open the camera software is received (step 110), the portable communication device opens the camera software (step 120), and the image browsing software to be pre-loaded after the camera software is opened is obtained by inquiring the pre-load relations according to the camera software (step 130). Hence, when receiving the command to open the image browsing software (step 160), the portable communication device opens the pre-loaded image browsing software (step 180). However, in other embodiments, different softwares may be pre-loaded according to different opened softwares.

Furthermore, the portable communication device operating method 100 may modify the stored pre-load relations according to the status of the operation of the portable communication device. Therefore, after the portable communication device opens the pre-loaded second software (step 180), the pre-load relation corresponding to the first software is modified according to the second software (step 190). The second software is opened in subsequent to the first software, so that the probability of opening the second software may be increased in the pre-load relation corresponding to first software. In this way, after the first software is opened next time, the probability of pre-loading the second software is increased. Furthermore, the modification on the pre-load relations (step 190) may also enable the pre-loaded software to conform better to the habits of the user, thus increasing the probability of loading the correct software to be opened by the user. Hence, the time for loading the software is more likely to be reduced.

Furthermore, by pre-loading several second softwares after the first software is opened, the probability that pre-loaded software is the software to be opened later is increased. The number of the second softwares obtained in step 140 can be plural, and the portable communication device can pre-load several second softwares (step 150). In this way, the probability of including the software to be opened by the command received in step 160 in the software pre-loaded in step 150 may be increased. Hence, there is a high probability of saving the time for loading the software.

In addition, the pre-load relations stored by the portable communication device may record the opening frequency, times or other parameters related to the opening frequency of the pre-loaded software after a preset software is opened, so as to serve as the basis for obtaining the second software in step 140. In step 140, the pre-load relations are inquired according to the first software, and thereby a high opening frequency software from the pre-load softwares is obtained as the second software and is pre-loaded in step 150. In this way, the probability of opening the pre-loaded second software after the first software is opened is increased.

In step 200, when the aforementioned another software desired to be opened is not the pre-loaded second software, the portable communication device loads and opens another software.

In step 210, according to the another software opened in step 200, the pre-load relation corresponding to the first software is modified according to the another software, wherein the another software is opened rather than the second software after the first software is opened. Since the another software opened in step 200 is executed in subsequence to the first software, the probability of subsequently opening the another software in the pre-load relation corresponding to first software may be increased. In this way, the probability of pre-loading the another software loaded in step 200 when the first software is opened next time is increased. Furthermore, the basis of modification in step 200 is the sequence of executing software in step 120 and step 190 by the user via the user interface. Therefore, after the modification in step 200, the prediction in step 130 at next time may conform better to the habits of the user in operating the portable communication device.

It can be seen from the above embodiments of the present invention that the application of the present invention has the following advantages. The opened first software is used as the basis for pre-loading a software, so that the pre-loaded software has a higher probability to be opened. Especially, when an embodiment of the present invention is applied in a portable communication device (for example, a smart phone, a PDA or another type of a portable communication device) with a limited hardware resource and a low loading speed, if a software to be opened is pre-loaded correctly, the execution efficiency of the portable communication device will be improved, thus saving the time for loading the software. Furthermore, pre-load relations of all softwares may be modified according to the opening sequence of the softwares to be operated by the portable communication device, so that the software pre-loaded by the portable communication device may conform better to the habits of the user.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A portable communication device operating method, comprising:

receiving a first software opening command to open a first software;

opening the first software by a portable communication device, wherein the portable communication device stores a plurality of pre-load relations, and each of the pre-load relations records at least one pre-load software to be pre-loaded after a preset software is opened, and the pre-load relations further record the frequency of opening the pre-load software after the preset software is opened;

inquiring the pre-load relations according to the first software so as to obtain at least one second software to be pre-loaded after the first software is opened;

pre-loading the second software by the portable communication device, wherein the step of pre-loading the second software by the portable communication device comprises:

inquiring the pre-load relations according to the first software so as to obtain a high opening frequency software from the pre-load software, and the second software, and pre-loading the second software to the portable communication device after the first software is opened;

receiving a second software opening command to open the second software; and opening the second software which has been pre-loaded by the portable communication device.

2. The portable communication device operating method of claim 1, further comprising:

modifying the pre-load relation corresponding to the first software according to a third software, wherein the third software is opened rather than the second software after the first software is opened.

3. The portable communication device operating method of claim 1, wherein after the first software is opened, the number of the second softwares to be pre-loaded is plural.

4. The portable communication device operating method of claim 3, further comprising:

modifying the pre-load relation corresponding to the first software according to a third software, wherein the third software is opened rather than the second software after the first software is opened.

5. The portable communication device operating method of claim 1, further comprising:

modifying the pre-load relation corresponding to the first software according to a third software, wherein the third software is opened rather than the second software after the first software is opened.

6. The portable communication device operating method of claim 1, wherein after the first software is opened, the number of the second softwares to be pre-loaded is plural.

7. The portable communication device operating method of claim 1, wherein the portable communication device is a smart phone or a personal digital assistant (PDA).

8. A portable communication device operating method, comprising:

receiving a first software opening command to open a first software;

opening the first software by a portable communication device, wherein the portable communication device stores a plurality of pre-load relations, and each of the pre-load relations records at least one pre-load software to be pre-loaded after a preset software is opened, and the portable communication device is a smart phone or a PDA;

inquiring the pre-load relations according to the first software so as to obtain at least one second software to be pre-loaded after the first software is opened, wherein after the first software is opened, the number of the second softwares to be pre-loaded is plural;

pre-loading the second softwares by the portable communication device;

receiving a second software opening command to open one of the second softwares;

opening the second software corresponding to the second software opening command that the second software has been pre-loaded by the portable communication device; and modifying the pre-load relation corresponding to the first software according to a third software, wherein the third software is opened rather than the second software after the first software is opened;

wherein the pre-load relations further record the frequency of opening the pre-loaded softwares after the preset software is opened, and the step of pre-loading the second softwares by the portable communication device comprises:

inquiring the pre-load relations according to the first software so as to obtain a plurality of high opening frequency softwares from the pre-load softwares as the second softwares, and pre-loading the second softwares to the portable communication device after the first software is opened.

* * * * *